(12) United States Patent
Wu et al.

(10) Patent No.: US 10,493,542 B2
(45) Date of Patent: *Dec. 3, 2019

(54) MITER SAW

(71) Applicant: TTI (MACAO COMMERCIAL OFFSHORE) LIMITED, Macau (MO)

(72) Inventors: Mingting Wu, Shanghai (CN); David E. Dutterer, Belton, SC (US); Michael R. Hart, Anderson, SC (US)

(73) Assignee: TTI (MACAO COMMERICAL OFFSHORE) LIMITED, Macau (MO)

( * ) Notice: Subject to any disclaimer, the term of this patent is extended or adjusted under 35 U.S.C. 154(b) by 95 days.

This patent is subject to a terminal disclaimer.

(21) Appl. No.: 15/397,447

(22) Filed: Jan. 3, 2017

(65) Prior Publication Data
US 2017/0113288 A1 Apr. 27, 2017

Related U.S. Application Data

(63) Continuation of application No. 14/410,002, filed as application No. PCT/CN2013/089644 on Dec. 17, 2013, now Pat. No. 9,533,362.

(30) Foreign Application Priority Data

Nov. 8, 2013 (CN) .......................... 2013 1 0554216

(51) Int. Cl.
*B23D 45/02* (2006.01)
*B23D 45/04* (2006.01)
(Continued)

(52) U.S. Cl.
CPC ......... *B23D 45/048* (2013.01); *B23D 47/025* (2013.01); *B27B 5/29* (2013.01);
(Continued)

(58) Field of Classification Search
CPC ............. Y10T 83/7697; Y10T 83/7701; Y10T 83/7705; Y10T 83/7722; Y10T 83/7728;
(Continued)

(56) References Cited

U.S. PATENT DOCUMENTS 2,966,179 A * 12/1960 Gaskell .................. B23Q 3/005
83/438
4,934,233 A 6/1990 Brundage
(Continued)

FOREIGN PATENT DOCUMENTS

CN 1032067 A 3/1989
CN 2486253 4/2002
(Continued)

OTHER PUBLICATIONS

Chinese Patent Office Action for Application No. 201610024181.7 dated Mar. 11, 2019, 11 pages.

*Primary Examiner* — Phong H Nguyen
(74) *Attorney, Agent, or Firm* — Michael Best & Friedrich LLP

(57) ABSTRACT

A miter saw includes a base having a peripheral wall, a table rotatably supported upon the base, and a miter angle lock. The miter angle lock includes a pin having a first end adjacent the peripheral wall and an opposite second end. The miter angle lock also includes a cam member engageable with the second end of the pin and movable between a locked position in which the first end of the pin is brought into frictional contact with the peripheral wall for locking the table relative to the base, and an unlocked position in which the first end of the pin is spaced from the peripheral wall of the base.

20 Claims, 3 Drawing Sheets

(51) Int. Cl.
  *B27B 5/29* (2006.01)
  *B23D 47/02* (2006.01)
(52) U.S. Cl.
  CPC ........ *Y10T 83/7697* (2015.04); *Y10T 83/7701* (2015.04); *Y10T 83/8773* (2015.04)
(58) Field of Classification Search
  CPC ............ Y10T 83/7693; Y10T 83/8773; B23D 47/025; B23D 45/048; B23D 45/024
  See application file for complete search history.

(56) References Cited

U.S. PATENT DOCUMENTS

| | | | |
|---|---|---|---|
| 5,165,315 A * | 11/1992 | Terada | ................... B21D 53/42 |
| | | | 269/56 |
| 5,249,496 A | 10/1993 | Hirsch et al. | |
| 5,595,124 A | 1/1997 | Wixey et al. | |
| 5,819,624 A | 10/1998 | Brault et al. | |
| 6,460,442 B2 | 10/2002 | Talesky et al. | |
| 6,474,206 B1 * | 11/2002 | Brunson | ............. B23D 45/044 |
| | | | 108/139 |
| 6,595,095 B2 * | 7/2003 | Chen | ................... B23D 45/044 |
| | | | 83/473 |
| 6,658,977 B2 * | 12/2003 | Chang | ................. B23D 45/044 |
| | | | 83/471.3 |
| 6,769,338 B2 | 8/2004 | Svetlik et al. | |
| 6,810,780 B2 | 11/2004 | Ceroll et al. | |
| 7,013,780 B2 | 3/2006 | Brunson | |
| 7,210,415 B2 | 5/2007 | Brunson | |
| 7,367,253 B2 | 5/2008 | Romo et al. | |
| RE41,320 E | 5/2010 | Lo et al. | |
| 7,845,260 B2 | 12/2010 | Terashima et al. | |
| 7,854,187 B2 | 12/2010 | Liu et al. | |
| 7,938,050 B2 | 5/2011 | Gehret | |
| 8,047,111 B2 | 11/2011 | Ushiwata et al. | |
| 8,061,251 B2 | 11/2011 | Hetcher et al. | |
| 8,573,104 B2 | 11/2013 | Thomas | |
| 8,607,678 B2 | 12/2013 | Gehret | |
| 8,850,660 B2 | 10/2014 | Kim | |
| 2003/0150311 A1 | 8/2003 | Carroll | |
| 2004/0154448 A1 * | 8/2004 | Romo | ................... B23D 47/025 |
| | | | 83/471.3 |
| 2005/0229761 A1 | 10/2005 | Bettacchini | |
| 2007/0199178 A1 | 8/2007 | Katsuma | |
| 2008/0210073 A1 | 9/2008 | Zhang | |
| 2009/0205474 A1 * | 8/2009 | Liu | ...................... B23D 45/044 |
| | | | 83/435.13 |
| 2011/0162502 A1 | 7/2011 | Thomas | |
| 2011/0185873 A1 | 8/2011 | Gehret | |
| 2011/0232449 A1 * | 9/2011 | Chiu | ................... B23D 47/025 |
| | | | 83/473 |
| 2015/0314381 A1 | 11/2015 | Wu | |

FOREIGN PATENT DOCUMENTS

| | | |
|---|---|---|
| CN | 201405121 | 2/2010 |
| CN | 201405396 | 2/2010 |
| CN | 202555900 | 11/2012 |
| CN | 202639506 | 1/2013 |
| CN | 103586532 A | 2/2014 |
| CN | 203664817 | 6/2014 |

* cited by examiner

MITER SAW

CROSS-REFERENCE TO RELATED APPLICATIONS

This application is a continuation of U.S. patent application Ser. No. 14/410,002 filed Dec. 19, 2014, which is a national stage entry under 35 U.S.C. § 371 of International Patent Application No. PCT/CN2013/089644 filed on Dec. 17, 2013, which claims priority to Chinese Patent Application No. 201310554216.8 filed Nov. 8, 2013, the entire contents of all of which are incorporated herein by reference.

FIELD OF THE INVENTION

The present invention relates generally to miter saws, and in particular to a miter saw capable of rapid table angular indexing and locking.

BACKGROUND OF THE INVENTION

Miter saws are commonly used power tools mainly for making an oblique cut in a workpiece at a certain angle. A typical miter saw includes a base, a table, a fence mounted on the table in a prescribed positional relationship with respect to the base, and a motor assembly mounted on the table, which is rotatable with the table and houses a blade. The table and base can pivot about a vertical axis and the table and base rotate relative to each other during cutting operations with an angle between the blade and a portion of the fence on which the workpiece is supported being adjusted to a value that corresponds to a desired angle of the oblique cut. In a practical oblique cutting operation, the table and base of a miter saw usually need to undergo the following three states: firstly, a complete loose between the table and base in which the table and base are rotatable relative to each other independently for enabling any desired angle adjustment; secondly, indexing of the table and base at a predetermined angular position; thirdly, interlocking of the table and base at the predetermined angular position.

In order to achieve the above said states, most known miter saws adopt complex indexing and locking mechanisms that are difficult to be manipulated and the manipulation includes several operations necessitating the use of an operator's both hands. As so far, there has been no miter saw with a reasonable structure and a great practicability that allows the angular indexing and interlocking between the base and table to be accomplished by a single hand.

SUMMARY OF THE INVENTION

An objective of the present invention is to provide a miter saw with a reasonable structure and a great practicability that allows the angular indexing and interlocking between the base and table to be accomplished by a single hand.

In accordance with this objective, the present invention provides a miter saw which includes: a base having a peripheral wall; a table rotatably supported upon the base; and a miter angle lock. The miter angle lock includes a pin having a first end adjacent the peripheral wall and an opposite second end. The miter angle lock also includes a cam member engageable with the second end of the pin and movable between a locked position in which the first end of the pin is brought into frictional contact with the peripheral wall for locking the table relative to the base, and an unlocked position in which the first end of the pin is spaced from the peripheral wall of the base.

The present invention also provides a miter saw which includes: a base having a plurality of grooves formed in a bottom surface thereof; a table rotatable with respect to the base; a rotary indexing mechanism including a body fixedly coupled to and rotatable with the table and a protrusion provided on the body, the protrusion configured to be received within one of the plurality of grooves of the base and thereby angularly index the table with respect to the base at a desired rotational position; and a locking mechanism operably coupled to the table and configured to lock the table at the desired rotational position.

In one specific embodiment, the miter saw further includes a support structure, and the rotary indexing mechanism and the locking mechanism are both fixedly coupled to the table via the support structure.

In one specific embodiment, the body of the rotary indexing mechanism is a retaining blade, and the retaining blade has one end fixedly connected to the support structure.

In one specific embodiment, the rotary indexing mechanism further includes a blade drive mechanism disposed in vicinity of the retaining blade and configured to drive the retaining blade to move between a first position at which the retaining blade causes the protrusion to be received in one of the plurality of grooves of the base, and a second position at which the retaining blade causes the protrusion to move out of the one of the plurality of grooves.

In one specific embodiment, the blade drive mechanism includes a indexing cam facing the retaining blade and a cam handle; the cam handle extends through the indexing cam and is in rotary connection with the support structure; and the cam handle drives the indexing cam to rotate and push the retaining blade to move between the first and second positions.

In one specific embodiment, the cam handle includes a shaft and the indexing cam defines a bore; the shaft extends through the bore and is in rotary connection with the support structure; and both the shaft and the bore have a non-circular radial cross section.

In one specific embodiment, along an axial direction of the shaft, the indexing cam is located between the support structure and the cam handle; a resilient retaining ring is located between the support structure and the indexing cam; and a resilient corrugated retaining ring is located between the indexing cam and the cam handle.

In one specific embodiment, the locking mechanism includes a locking pin which extends through a bore in the support structure and comes in contact with an outer circumstantial surface of the base; and a friction force between one end face of the locking pin and the outer circumstantial surface of the base causes the table to be locked.

In one specific embodiment, the locking mechanism further includes a locking handle and a friction sheet; the locking handle has a locking cam fixedly disposed thereon; the other end face of the locking pin is in contact with the friction sheet; and when the locking handle rotates, the locking cam synchronously pushes the friction sheet and thereby causes the locking pin to make contact with the outer circumstantial surface of the base.

In one specific embodiment, the locking handle is in rotary connection with the support structure by a rotary pin.

In one specific embodiment, the locking mechanism further includes a spring disposed along an axis direction of the locking pin and between the locking pin and the friction sheet; the spring has one end fixedly connected to the locking pin and the other end connected to the friction sheet by an open ring.

In one specific embodiment, axes of the bore and locking pin both extend along a radial direction of the outer circumstantial surface of the base.

The present invention uses a rotary indexing mechanism to achieve the relative rotational position indexing between the base and the table and uses a locking mechanism to further realize the interlocking between the base and the table, and both the rotary indexing mechanism and the locking mechanism are fixedly connected to the table. Such design enables the construction of a more reasonable and practical structure that allows the angular indexing and interlocking to be accomplished by a single hand. In addition, by coupling the table and the rotary indexing mechanism to the base from the top side and the bottom side of the base, respectively, the table and the rotary indexing mechanism further creates a clamping effect on the base, which can promote the position indexing performance compared to conventional indexing mechanisms.

In these figures: 1—table; 2—base; 3—retaining blade; 4—locking handle; 5—rotary pin; 6—screws; 7—washers; 8—spring washers; 9—screw; 10—friction sheet; 11—support structure; 12—locking pin; 13—spring; 14—open ring; 15—resilient retaining ring for shaft use; 16—indexing cam; 17—resilient corrugated retaining ring for shaft use; 18—cam handle; 19—shaft; 20—grooves; 21—protrusion; 22, 23—bores; 24—cam-accommodating gap; 25—bore; 26—locking cam; 27—screw; 30—outer circumstantial surface; and L-axis.

DETAILED DESCRIPTION

The miter saw of the present invention will be described in greater detail in the following description which demonstrates an exemplary embodiment of the present invention, in conjunction with FIGS. 1 to 3. It is understood that those skilled in the art can make modifications and alterations to the invention without departing from the true scope and spirit of the invention.

Figure 1:
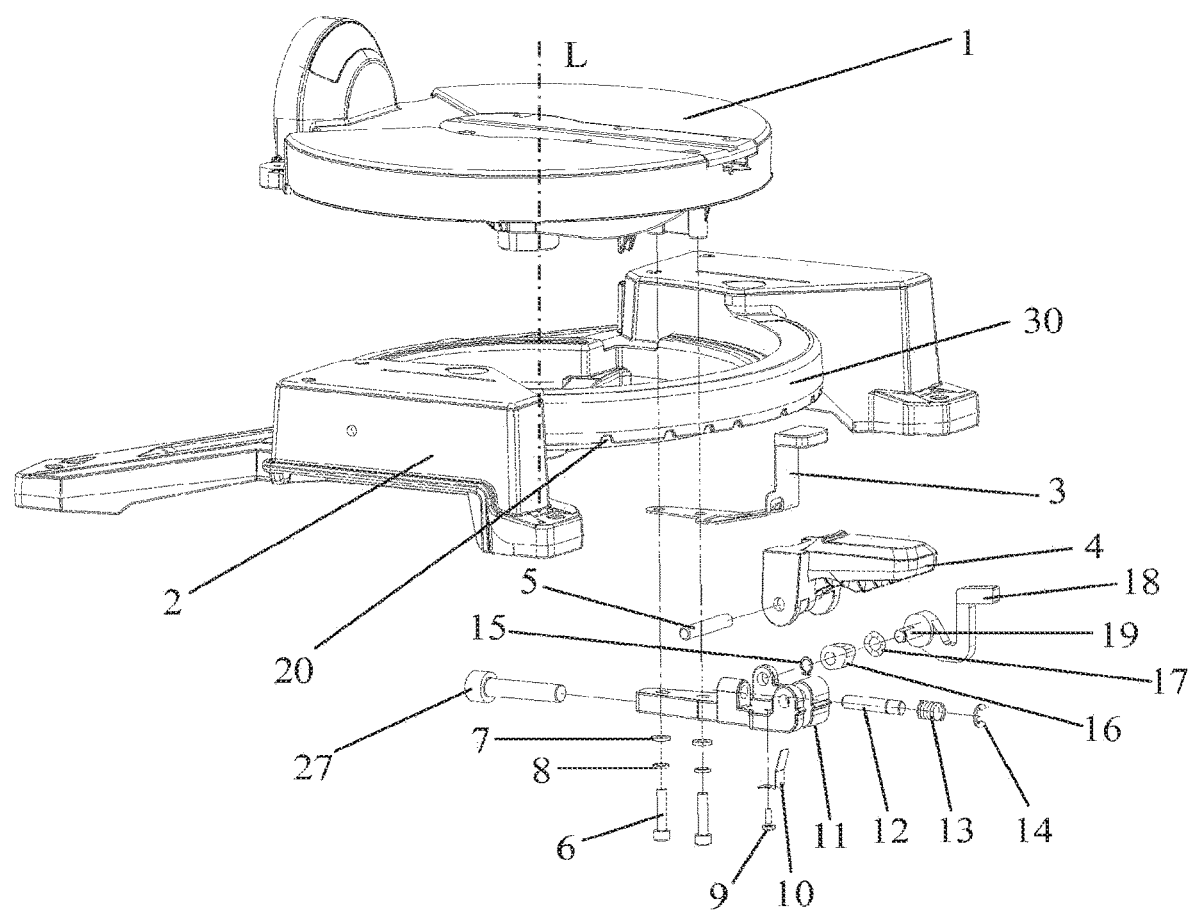
FIG. 1 is a schematic illustration of a miter saw in accordance with one embodiment of the present invention.

Referring now to FIG. 1, the embodiment provides a miter saw including at least a base 2 and a table 1 in coaxial rotary connection. As used herein, the term "coaxial rotary connection" denotes that center axes of the base 2 and the table 1 coincide and extend along the same straight line indicated as an axis L in FIG. 1. The table is rotatable about the axis L, while the base 2 is stationary. In other words, the table 1 can rotate about the axis L with respect to the base 2. The base 2 and the table 1 have complementary shapes. In this embodiment, the base 2 substantially resembles a ring and the table 1 substantially resembles a disk. The miter saw further includes a rotary indexing mechanism and a locking mechanism that are coupled to the table 1 by a support structure 11. The relative rotational position between the base 2 and the table 1 is indexed by the rotary indexing mechanism. After being indexed, the base 2 and the table 1 are interlocked by the locking mechanism. The table 1 and the rotary indexing mechanism are coupled to the base 2 from a top side and a bottom side of the base 2, respectively. More specifically, the table 1 is positioned on the base 2 from the top side of the base 2, whilst a protrusion 21 of the rotary indexing mechanism is received in a groove 20 of the base 2 from the bottom side of the base 2 (as will be described in detail below).

Figure 2:
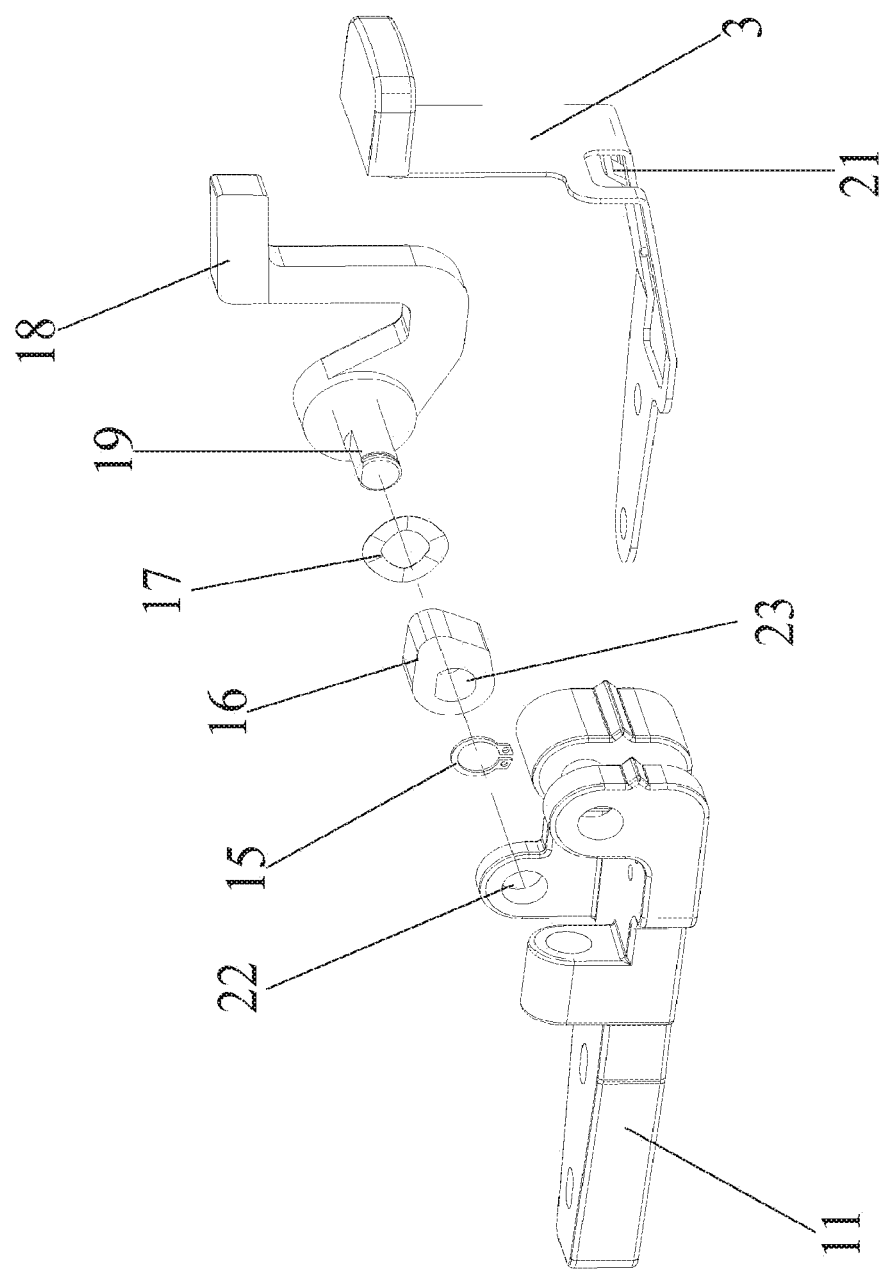
FIG. 2 diagrammatically depicts a rotary indexing mechanism used in one embodiment of the present invention.

Referring to FIG. 2, in conjunction with FIG. 1, the rotary indexing mechanism includes at least a retaining blade 3. One end of the retaining blade 3 is in fixed connection with the support structure 11. The retaining blade 3 has the protrusion 21 formed thereon which is complementary in shape with the groove 20 preformed in a bottom side of the base 2. The indexing of the relative rotational position between the base 2 and the table 1 is accomplished when the protrusion 21 is received in a corresponding groove 20 from the bottom side of the groove 20, and will be destroyed after the protrusion 21 moves out of the groove 20. In order to angularly index the table 1 with respect to the base 2 at different rotational positions, there are a plurality of the grooves 20 formed in the bottom side of the base 2. The plurality of grooves 20 are in the same shape and arranged either equidistantly or not. In addition, the number and arrangement of the grooves 20 are adjustable according to practical needs. As such, the table 1 can be indexed at a desired rotational position with respect to the base 2 by positioning the protrusion 21 of the retaining blade 3 in a corresponding one of the grooves 20.

In this embodiment, the support structure 11, table 1 and retaining blade 3 are secured together using screws 6, pads 7 and spring washers 8. The screws 6 may be implemented as M6 screws, the pads 7 may be implemented as Φ6 pads and the spring washers 8 may be implemented as Φ6 spring washers. Additionally, the support structure 11 is further provided at its front end with an M6 screw 27 for adjusting a distance from a mounting position of the support structure 11 for ensuring a sufficient space for enabling two cams 16 and 26, described in detail below, to rotate therein to realize the indexing and interlocking operations.

The rotary indexing mechanism further includes a blade drive mechanism. The retaining blade 3 is coupled to the blade drive mechanism. Under the action of this blade drive mechanism, the retaining blade 3 can be bent itself such that the protrusion 21 is evacuated from the corresponding groove 20. The blade drive mechanism is in rotary connection to the support structure 11.

More specifically, as shown in FIG. 2, the blade drive mechanism includes an indexing cam 16 and a cam handle 18. A shaft 19 is fixedly provided on the handle 18 and the shaft 19 successively extends through a bore 23 in the cam 16 and a bore 22 in the support structure 11. The shaft 19 and the bore 23 have the same non-circular cross section and can therefore rotate in a synchronized manner. Further, the bore 22 in the support structure 11 has an inner diameter that is larger than an outer diameter of the shaft 19, and the shaft 19 can thus rotate within the bore 22.

With reference to FIG. 2, in this embodiment, the radial cross section of the shaft 19 is delimited by a major arc and the cord of the arc. As the shape of the shaft is complementary to that of the bore 23 in the cam 16, the shaft 19 and the cam 16 can thus rotate coaxially and synchronously. The present invention is not limited in this regard as the shaft 19 and the bore 23 may also be enabled in other forms, such as, for example, by a spline connection, to achieve the synchronized rotation.

Along an axial direction of the shaft 19, the cam 16 is located between the support structure 11 and the cam handle 18. A resilient retaining ring 15 for shaft use is provided between the support structure 11 and cam 16, and a resilient corrugated retaining ring 17 for shaft use is position between the cam 16 and the cam handle 18. The resilient retaining ring 15 may be implemented as a resilient Φ8 ring for shaft use.

After the blade drive mechanism, support structure 11 and retaining blade 3 are assembly together, the shaft 19 and the support structure 11 are in rotary connection, which allows the shaft 19 and the cam handle 18 to rotate about the axial direction of the shaft 19. The rotation of the cam handle 18 drives the cam 16 to rotate synchronously and hence the cam 16 comes in contact with the blade 3. With the cam 16 further rotating, it pushes against the retaining blade 3 and, as a result, bends the retaining blade 3. In this embodiment, the cam 16 is arranged above the retaining blade 3 and pushes the retaining blade 3 downwardly to make the bend.

When to adjust the rotational angle of the table 1 with respect to the base 2, the cam handle 18 is rotated to drive the cam 16 to rotate about a center line of the bore 23. As the cam 16 contacts the retaining blade 3, the rotation of the cam 16 generates a downward force on the retaining blade 3 which bends the blade 3 and thereby makes the protrusion 21 on the retaining blade 3 move out of the corresponding receiving groove 20 of the base 2. After this, the table 1 is rotatable with respect to the base 2 freely.

Figure 3:
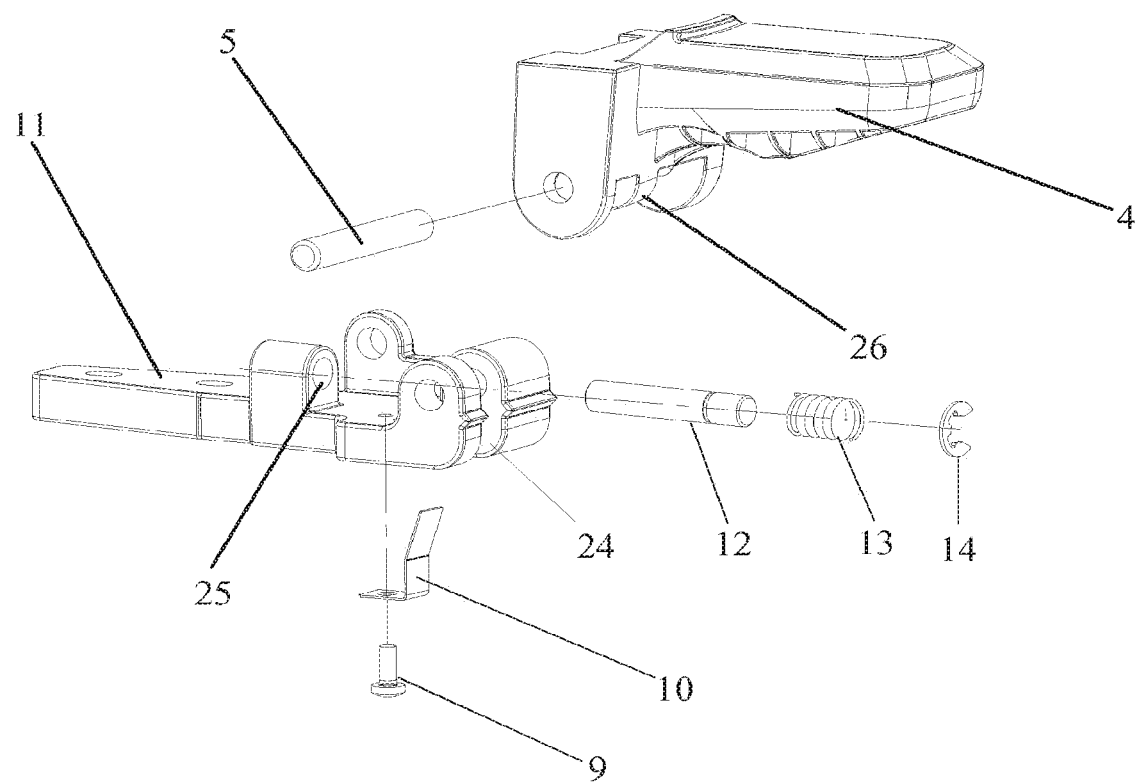
FIG. 3 diagrammatically depicts a locking mechanism used in one embodiment of the present invention.

Referring to FIG. 3, the locking mechanism includes a locking pin 12. The locking pin 12 extends through a bore 25 in the support structure 11 and contacts an outer circumstantial surface 30 of the base 2. Because of this contact between a front end face of the locking pin 12 and the outer circumstantial surface 30 of the base 2, there is a friction force between the two surfaces which maintains the base 2 and the table 1 in an interlocked state.

The locking mechanism further includes a locking drive mechanism. The locking drive mechanism includes a locking handle 4 and a friction sheet 10. A rear end face of the locking pin 12 contacts the friction sheet 10, and the friction sheet 10 can be bent to drive the locking pin 12 to make contact with the outer circumstantial surface 30 of the base 2 to accomplish the lock operation. The bending of the friction sheet 10 can be accomplished by rotating the locking handle 4.

The locking handle 4 has a locking cam 26 fixedly mounted thereon. The locking cam 26 pushes the friction sheet 10 with the rotating of the locking handle 4 and hence causes the friction sheet 10 to be bent. In this embodiment, the support structure 11 defines a gap 24 in which the friction sheet 10 is disposed and the cam 26 rotates in the gap 24 to push the friction sheet 10. One end of the friction sheet 10 is fixed on the support structure 11 using a screw 9. The screw 9 may be implemented as an M4 screw. Reference may be made to the cam 16 for a better understanding of the cam 26. Compared to wheel-shaped structures functioning in a similar way used in conventional miter saws, these cams 26 and 16 are advantageous in owning a protrusion that can push the friction sheet 10 and the retaining blade 3, respectively, when the cams rotate.

The locking handle 4 is in rotary connection with the support structure 11 by means of a rotary pin 5.

The locking drive mechanism further includes a spring 13 which is stretchable and compressible in an axis direction of the locking pin 12. The spring 13 surrounds the locking pin 12 and has its one end fixedly connected to the locking pin 12 and the other end connected to the friction sheet 10 through an open ring 14.

In this embodiment, locking the table 1 against the base 2 can be accomplished by rotating the locking handle 4 downwardly to cause the cam 26 to push the friction sheet 10. The sheet 10 then drives the locking pin 12 to move forward and press against the outer circumstantial surface 30 of the base 2 at a front end of the driving the locking pin 12. In this configuration, a friction force between the front end of the locking pin 12 and the outer circumstantial surface 30 can maintain the table 1 and the base 2 in a desired interlocked state. Further, the spring 13 surrounding the locking pin 12 acts as a withdrawal means which pulls the locking pin 12 back to the original position when the locking handle 4 is loosened.

Referring to FIGS. 1 and 3, axes of the bore 25 and the locking pin 12 both extend along a radial direction of the outer circumstantial surface 30 of the base 2. Therefore, the static friction force existing in the interlocked configuration is directed tangent to the outer circumstantial surface 30.

As described above, the miter saw of the present invention uses a rotary indexing mechanism to achieve the rotational position indexing between the base and the table and uses a locking mechanism to further realize the interlocking between the base and the table. Both the rotary indexing mechanism and the locking mechanism are mounted on a support structure that is fixedly connected to the table. Such design enables the construction of a more reasonable and practical structure that allows the position indexing and interlocking to be accomplished by a single hand. In addition, by coupling the table and the rotary indexing mechanism to the base from the top side and the bottom side of the base, respectively, the table and the rotary indexing mechanism further creates a clamping effect on the base, which can promote the position indexing performance compared to conventional indexing mechanisms.

Various features of the invention are set forth in the following claims.

What is claimed is:

1. A miter saw comprising:
    a base having a peripheral wall;
    a table rotatably supported upon the base; and
    a miter angle lock including
        a pin having a first end adjacent the peripheral wall and an opposite second end,
        a cam member engageable with the second end of the pin and movable between a locked position in which the first end of the pin is brought into frictional contact with the peripheral wall for locking the table relative to the base, and an unlocked position in which the first end of the pin is spaced from the peripheral wall of the base, and
        a biasing member that moves the first end of the pin away from the peripheral wall when the cam member is in the unlocked position;
    wherein the miter angle lock further includes a wear plate having a first end fixed relative to the table and a second, distal end positioned between the cam member and the second end of the pin such that the cam member and the second end of the pin are directly engageable with the wear plate.

2. The miter saw of claim 1, wherein the miter angle lock further includes an actuator for moving the cam member between the locked position and the unlocked position.

3. The miter saw of claim 2, wherein the actuator is pivotable about a pivot axis in unison with the cam member.

4. The miter saw of claim 3, further comprising a bracket coupling the table and the miter angle lock, wherein the cam member and actuator are pivotably coupled to the bracket about the pivot axis.

5. The miter saw of claim 4, wherein the bracket includes a housing having a cylindrical bore in which the pin is slidably received, and wherein the miter angle lock further includes a retainer coupled to the pin, and wherein the biasing member is positioned between the housing and the retainer.

6. The miter saw of claim 3, wherein the actuator includes a pair of lobes, each having an aperture coaxial with the pivot axis, and wherein the cam member is positioned between the lobes.

7. The miter saw of claim 6, wherein the cam member includes an aperture coaxial with the pivot axis.

8. The miter saw of claim 2, further comprising a miter angle adjustment system including
   a detent actuator spaced from the actuator of the miter angle lock,
   a detent release member having a detent sized to be received within a recess of the base, and
   a detent bypass cam engageable with the detent release member to move the detent away from the recess of the base in response to movement of the detent actuator.

9. The miter saw of claim 1, further comprising a miter angle adjustment system including
   a detent release lever;
   a detent extending from the detent release lever; and
   a plurality of recesses defined in the base coinciding with predetermined miter angle positions of the table relative to the base.

10. The miter saw of claim 9, wherein the detent release lever defines an aperture through which the pin protrudes to engage the peripheral wall when in the locked position.

11. The miter saw of claim 9, wherein the detent release lever is adjustable between a first position in which the detent is received in one of the plurality of recesses, and a second position in which the detent is not received in any of the recesses.

12. The miter saw of claim 11, wherein the detent release lever is biased toward the first position.

13. The miter saw of claim 12, wherein the detent release lever is operable to be manually actuated into the second position.

14. The miter saw of claim 13, wherein the table is freely rotatable relative to the base when the detent release lever is held in the second position and when the cam member is in the unlocked position.

15. The miter saw of claim 9, wherein the detent release lever is configured as a leaf spring.

16. The miter saw of claim 9, further comprising a detent bypass mechanism including
   a detent bypass cam engageable with the detent release lever; and
   a detent bypass lever coupled for co-rotation with the detent bypass cam.

17. The miter saw of claim 16, wherein the detent bypass cam is pivotable between a first position, in which the detent release lever is located in a first position where the detent is received in one of the plurality of recesses, and a second position, in which the detent release lever is held in a second position where the detent is not received in any of the recesses.

18. The miter saw of claim 17, wherein the detent bypass cam bends the detent release lever in response to the detent bypass cam pivoting from the first position toward the second position.

19. The miter saw of claim 18, wherein the detent release lever is biased toward the first position, and wherein the detent release lever returns from the second position toward the first position in response to the detent bypass cam pivoting from the second position toward the first position.

20. The miter saw of claim 1, further comprising a bracket coupling the table and the miter angle lock, wherein the bracket includes a bore in which the pin is received, and wherein the biasing member is positioned between an opening of the bore and the second end of the pin.

* * * * *